(12) United States Patent
Okada et al.

(10) Patent No.: US 10,796,172 B2
(45) Date of Patent: Oct. 6, 2020

(54) IMAGE PROCESSING DEVICE AND IMAGE PROCESSING METHOD

(71) Applicant: DENSO TEN Limited, Kobe-shi, Hyogo (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/574,546

(22) Filed: Sep. 18, 2019

(65) Prior Publication Data

US 2020/0193192 A1    Jun. 18, 2020

(30) Foreign Application Priority Data

Dec. 14, 2018    (JP) .................................. 2018-234808

(51) Int. Cl.
*G06K 9/00* (2006.01)
*G06K 9/32* (2006.01)
*G06K 9/46* (2006.01)

(52) U.S. Cl.
CPC ....... *G06K 9/00812* (2013.01); *G06K 9/3233* (2013.01); *G06K 9/4628* (2013.01); *G06K 9/4676* (2013.01)

(58) Field of Classification Search
CPC ............. G06K 9/00812; G06K 9/4676; G06K 9/4628; G06K 9/3233
See application file for complete search history.

(56) References Cited

U.S. PATENT DOCUMENTS

2015/0294163 A1    10/2015    Sakamoto
2015/0344028 A1    12/2015    Gieseke et al.
(Continued)

FOREIGN PATENT DOCUMENTS

JP    2003-032669 A    1/2003
JP    2009-288867 A    12/2009
(Continued)

OTHER PUBLICATIONS

U.S. Appl. No. 16/574,395, filed Sep. 18, 2019 in the name of Yasutaka Okada et al.
(Continued)

*Primary Examiner* — Joseph W Becker
(74) *Attorney, Agent, or Firm* — Oliff PLC (57) ABSTRACT

An image processing device includes: a delimiting line detection unit that detects a delimiting line candidate based on image data obtained by capturing a surrounding of a vehicle; and an exclusion determination unit that determines whether to exclude the delimiting line candidate. When a white delimiting line candidate having higher luminance than the road surface luminance and a black delimiting line candidate having lower luminance are detected, and one of the white and black delimiting line candidates is set as at least one first delimiting line candidate, and the other thereof is set as a second delimiting line candidate while the at least one first delimiting line candidate includes a pair of first delimiting line candidates between which the second delimiting line candidate is arranged and a distance between the pair is equal to or smaller than a threshold, the second delimiting line candidate is excluded.

4 Claims, 6 Drawing Sheets

(56) References Cited

U.S. PATENT DOCUMENTS

| | | | |
|---|---|---|---|
| 2016/0039409 | A1 | 2/2016 | Hayakawa et al. |
| 2016/0272244 | A1 | 9/2016 | Imai et al. |
| 2018/0215413 | A1 | 8/2018 | Inagaki |
| 2018/0307919 | A1 | 10/2018 | Hayakawa |
| 2019/0073902 | A1 | 3/2019 | Indoh et al. |
| 2020/0062242 | A1* | 2/2020 | Hayakawa ............. G08G 1/143 |
| 2020/0104613 | A1* | 4/2020 | Hirai ..................... G06K 9/3241 |

FOREIGN PATENT DOCUMENTS

| | | |
|---|---|---|
| JP | 2012-176641 A | 9/2012 |
| JP | 2013-001366 A | 1/2013 |
| JP | 2014-106731 A | 6/2014 |
| JP | 2015-104982 A | 6/2015 |
| JP | 2015-185138 A | 10/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| WO | 2014/084118 A1 | 6/2014 |
| WO | 2017/068699 A1 | 4/2017 |

OTHER PUBLICATIONS

U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.

* cited by examiner

IMAGE PROCESSING DEVICE AND IMAGE PROCESSING METHOD

CROSS-REFERENCE TO RELATED APPLICATIONS

This application is based upon and claims the benefit of priority from prior Japanese patent application No. 2018-234808, filed on Dec. 14, 2018, the entire contents of which are incorporated herein by reference.

BACKGROUND

Technical Field

The present disclosure relates to an image processing device and an image processing method.

Related Art

In recent years, as automatic driving technology is developed, an image processing device configured to detect a parking space for parking a vehicle from image data obtained by capturing a surrounding of the vehicle is spread. In the image processing device, delimiting lines for delimiting the parking space are detected from the captured data, and the parking space is detected on the basis of the detected delimiting lines (for example, refer to JP-A-2017-87758).

SUMMARY

However, in the related art, for example, when two parallel lines with a narrow interval, such as a U-shaped delimiting line, are drawn on a road surface, an area between the two parallel lines may be falsely detected as the delimiting line. Thereby, the parking space may not be normally detected.

Aspect of non-limiting embodiments of the present disclosure relates to provide an image processing device and an image processing method capable of improving detection accuracy of a delimiting line.

According to an aspect of the present disclosure, there is provided an image processing device including: a delimiting line detection unit configured to detect a delimiting line candidate based on image data obtained by capturing a surrounding of a vehicle, the delimiting line candidate being a candidate of a delimiting line for delimiting a parking space; and an exclusion determination unit configured to determine whether or not to exclude the delimiting line candidate detected by the delimiting line detection unit from the candidate of the delimiting line, wherein, in a case where at least one white delimiting line candidate which is detected from a delimiting line having luminance higher than luminance of a road surface, and at least one black delimiting line candidate which is detected from a delimiting line having luminance lower than the luminance of the road surface are detected, and one of the at least one white delimiting line candidate and the at least one black delimiting line candidate is set as at least one first delimiting line candidate, and other of the at least one white delimiting line candidate and the at least one black delimiting line candidate is set as at least one second delimiting line candidate while the at least one first delimiting line candidate includes a pair of first delimiting line candidates between which the at least one second delimiting line candidate is arranged and a distance between the first delimiting line candidates of the pair of first delimiting candidates is equal to or smaller than a predetermined threshold value, the exclusion determination unit excludes the at least one second delimiting line candidate from the candidate of the delimiting line.

According to the present disclosure, it may be possible to improve detection accuracy of the delimiting line.

BRIEF DESCRIPTION OF DRAWINGS

Exemplary embodiment(s) of the present invention will be described in detail based on the following figures, wherein.

DETAILED DESCRIPTION

Hereinbelow, an exemplary embodiment of the image processing device and the image processing method according to the present disclosure will be described in detail with reference to the accompanying drawings. In the meantime, the present disclosure is not limited to the exemplary embodiment.

<Outline of Image Processing Device>

Figure 1A:
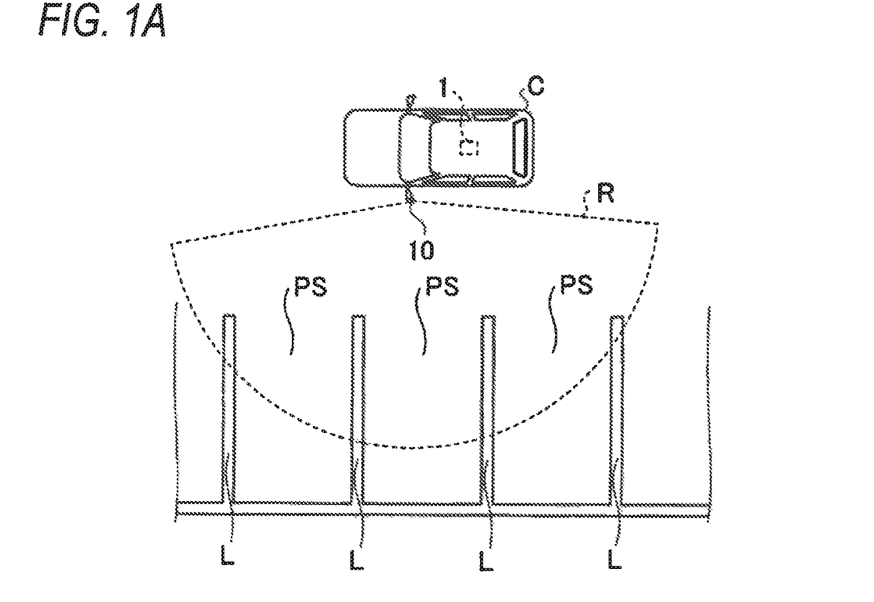
FIG. 1A depicts an example in which an image processing device according to an exemplary embodiment is mounted.
Figure 1B:
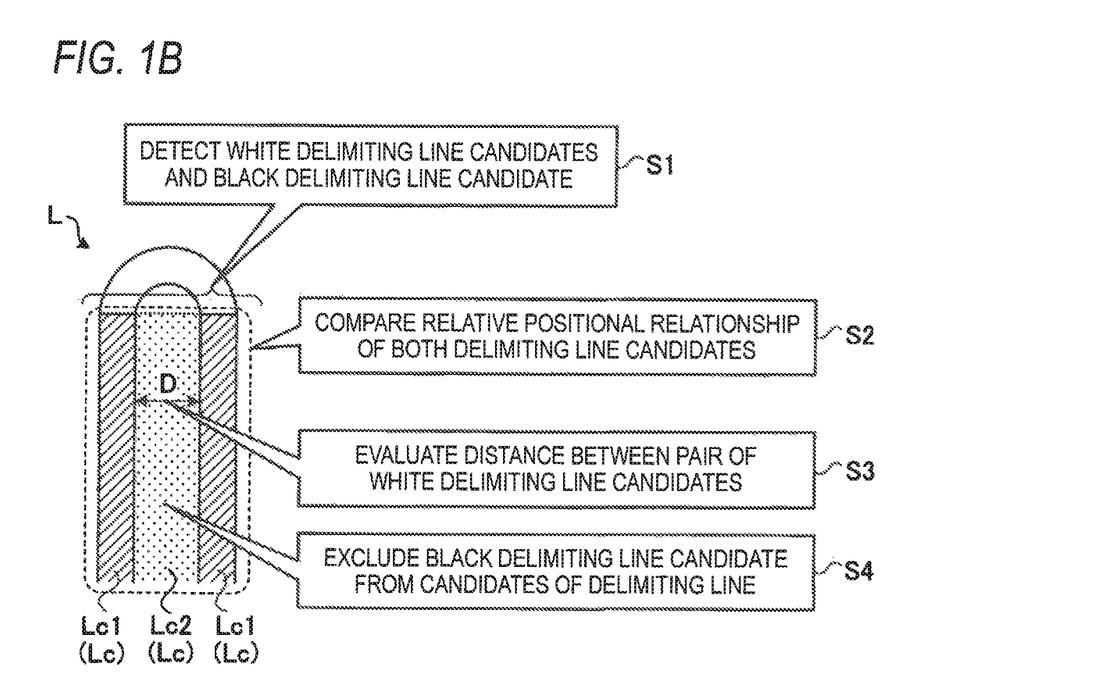
FIG. 1B illustrates details of an image processing method according to the exemplary embodiment.

First, an outline of an image processing device according to an exemplary embodiment is described with reference to FIGS. 1A and 1B. FIG. 1A depicts an example in which an image processing device 1 is mounted. Also, FIG. 1B depicts an outline of an image processing method according to the exemplary embodiment. The image processing method is executed by the image processing device 1 shown in FIG. 2.

As shown in FIG. 1A, the image processing device 1 according to the exemplary embodiment is mounted on a vehicle C, and is configured to detect delimiting lines L from captured data captured by a vehicle-mounted camera 10 and to detect parking spaces PS from the delimiting lines L.

The vehicle-mounted camera 10 includes an imaging element such as a CCD (Charge Coupled Device), a CMOS (Complementary Metal Oxide Semiconductor) and the like, for example, and is configured to capture a surrounding of the vehicle C. Also, a lens of the vehicle-mounted camera 10, for which a wide-angle lens such as a fish-eye lens is adopted, for example, has an imaging area R as shown in FIG. 1A.

Meanwhile, in the example of FIG. 1A, the vehicle-mounted camera 10 is a left side camera configured to capture a left side of the vehicle C. However, the vehicle-mounted camera 10 includes a front camera configured to capture a front of the vehicle C, a rear camera configured to capture a rear of the vehicle C, a right side camera configured to capture a right side of the vehicle C, and the like.

When detecting the parking spaces PS, the image processing device 1 detects delimiting line candidates Lc (refer to FIG. 1B), which are candidates of the delimiting line L for delimiting each parking space PS, and detects the parking spaces PS on the basis of the detected delimiting line candidates Lc.

However, for example, when two parallel lines with a narrow interval, such as a U-shaped delimiting line, are drawn on a road surface, an area between the two parallel lines may be falsely detected as the delimiting line L.

When the two parallel lines with a narrow interval are drawn, a total of four edge lines connecting edge points based on luminance of each pixel are detected with a narrow interval from the image data, so that the delimiting line candidates Lc are detected on the basis of the two inner edge lines of the four edge lines, too.

When the parking space PS is detected on the basis of the falsely detected delimiting line candidates Lc, the parking space PS may not be normally detected.

Therefore, the image processing device 1 according to the exemplary embodiment is configured to exclude the delimiting line candidate Lc, which has been falsely detected as the delimiting line L, from the candidates of the delimiting line L by predetermined processing. Thereby, the image processing device 1 according to the exemplary embodiment can improve the detection accuracy of the delimiting line L.

Specifically, as shown in FIG. 1B, the image processing device 1 first detects white delimiting line candidates Lc1 and a black delimiting line candidate Lc2 from the captured data (step S1). For example, the image processing device 1 detects the white delimiting line candidates Lc1 and the black delimiting line candidate Lc2, based on edge lines connecting edge points obtained by performing edge emphasizing for the captured data. Meanwhile, in the example of FIG. 1B, a U-shaped delimiting line L is shown.

Here, the white delimiting line candidate Lc1 is a delimiting line candidate Lc that is detected from a delimiting line L having luminance higher than the road surface, and the black delimiting line candidate Lc2 is a delimiting line candidate Lc that is detected from a delimiting line L having luminance lower than the road surface.

That is, it may be possible to identify whether the delimiting line candidate Lc detected on the basis of the captured data is the white delimiting line candidate Lc1 or the black delimiting line candidate Lc2 by comparing luminance of the delimiting line candidates Lc and luminance of a surrounding road surface through a luminance difference pattern and the like.

For example, in a case in which the U-shaped delimiting line L is drawn with white lines, the linear white line part is detected as the white delimiting line candidate Lc1 because the linear white line part has luminance higher than the surrounding road surface in a light environment such as daytime, and an area between the white line parts is detected as the black delimiting line candidate Lc2 because the area has luminance lower than the white line parts located at both sides thereof.

In the meantime, "white" of the white delimiting line candidate Lc1 does not indicate a white color but indicates that luminance is high. Also, "black" of the black delimiting line candidate Lc2 does not indicate a black color but indicates that luminance is low.

In step S1, the pair of white delimiting line candidates Lc1 and one black delimiting line candidate Lc2 are detected.

In the following drawings, for easy understanding, the descriptions are made on the basis of the drawings obtained by converting the captured data into bird's eye views. Also, in the following drawings, for easy understanding, the white delimiting line candidate Lc1 is hatched with oblique lines, and the black delimiting line candidate Lc2 is hatched with dots.

Then, the image processing device 1 compares a relative positional relationship of both the detected delimiting line candidates Lc (the white delimiting line candidates Lc1 and the black delimiting line candidate Lc2) (step S2). When the pair of white delimiting line candidates Lc1 is arranged with the black delimiting line candidate Lc2 being interposed therebetween, the image processing device 1 evaluates a distance D between the pair of white delimiting line candidates Lc1 (step S3).

When the distance D between the pair of white delimiting line candidates Lc1 is equal to or smaller than a predetermined threshold value, the image processing device 1 determines that the black delimiting line candidate Lc2 located between the pair of white delimiting line candidates Lc1 is a non-delimiting line located between the two delimiting lines forming the U-shaped delimiting line, and excludes the same from the candidates of the delimiting line L (step S4). In the meantime, the predetermined threshold value is a value corresponding to a line width of the delimiting line L, and is, for example, a value of 5 cm to 10 cm.

Thereby, the image processing device 1 can exclude the falsely detected black delimiting line candidate Lc2 from the candidates of the delimiting line L. Therefore, according to the exemplary embodiment, it may be possible to improve the detection accuracy of the delimiting line L, in the light environment such as daytime.

Also, in the exemplary embodiment, in the case in which the two parallel lines with a narrow interval, such as the U-shaped delimiting line L, are drawn on the road surface, it is not detected in the image processing and the like that the delimiting line L is a U-shaped line, and it can be detected that the two parallel lines is a single delimiting line L. Therefore, according to the exemplary embodiment, since it is not necessary to detect that the delimiting line L is a U-shaped line, in the image processing and the like, it may be possible to suppress a processing load of the image processing device 1.

<Configuration Example of Image Processing Device>

Figure 2:
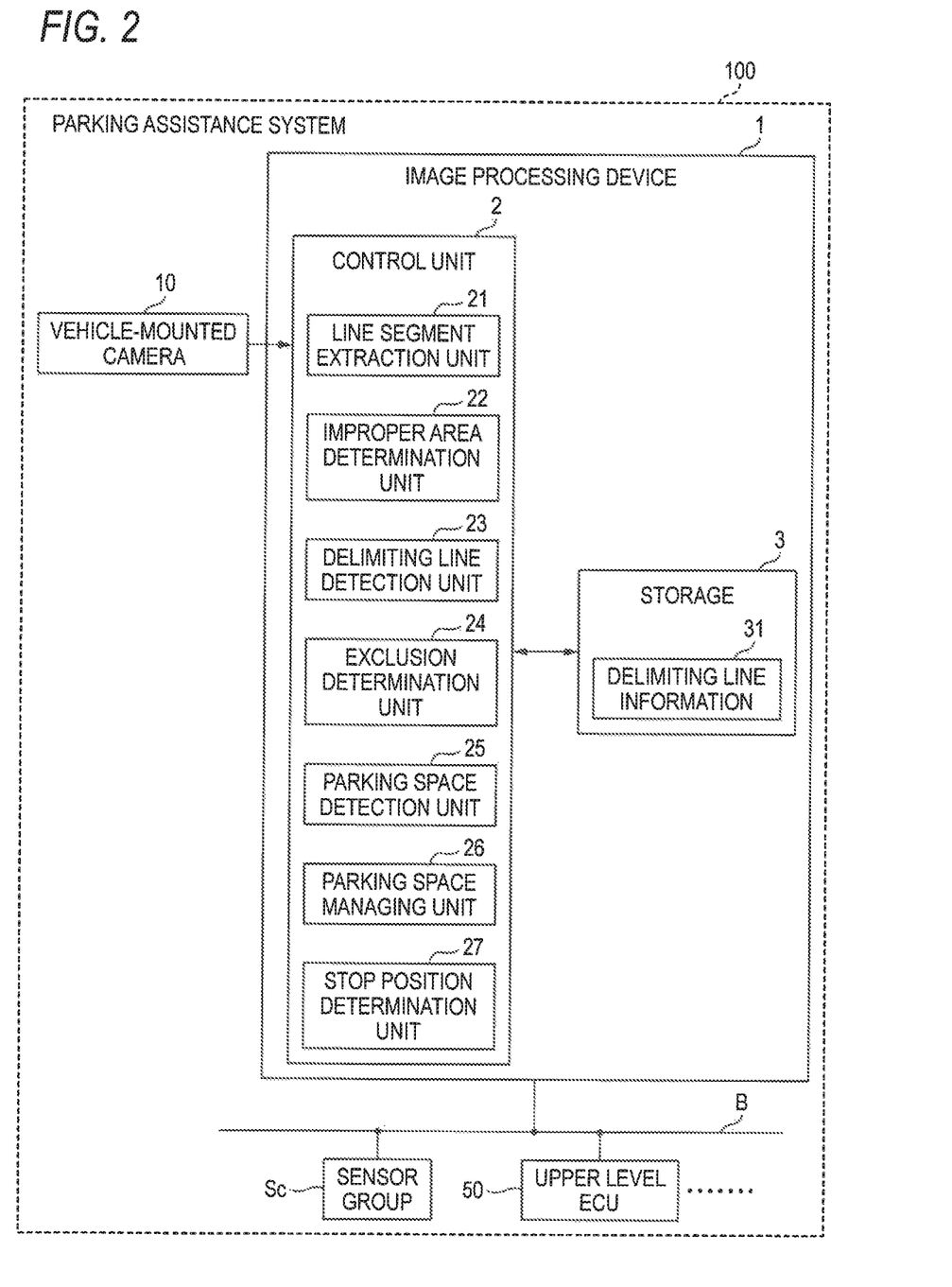
FIG. 2 is a block diagram depicting a configuration of a parking assistance system according to the exemplary embodiment.

Subsequently, a configuration example of the image processing device 1 according to the exemplary embodiment is described with reference to FIG. 2. FIG. 2 is a block diagram of the image processing device 1. In the meantime, FIG. 2 depicts a parking assistance system 100 including the image processing device 1.

As shown in FIG. 2, the parking assistance system 100 includes the image processing device 1, the vehicle-mounted camera 10, a sensor group Sc, and an upper level ECU 50 (Electronic Control Unit) 50. Also, as shown in FIG. 2, the image processing device 1, the sensor group Sc and the upper level ECU 50 can perform communication with one another via a communication bus B of communication protocols of CAN (Control Area Network) communication.

The sensor group Sc includes a variety of sensors configured to detect a traveling state of the vehicle C (refer to FIG. 1A), and is configured to notify detected sensor values to the image processing device 1. The sensor group Sc includes a vehicle speed sensor configured to detect the number of rotations of a wheel of the vehicle C, a steering angle sensor configured to detect a steering angle of the vehicle C, and the like.

The upper level ECU 50 is an ECU configured to support automatic parking of the vehicle C, for example, and is configured to control such that the vehicle C is parked in the parking space PS, based on the parking space PS detected by the image processing device 1, for example.

For example, the upper level ECU 50 is an EPS (Electric Power Steering)-ECU configured to control the steering angle of the vehicle C, and can control the steering angle relative to the parking space PS detected by the image processing device 1. In the meantime, the upper level ECU 50 may include an ECU configured to perform accelerator control and brake control.

As shown in FIG. 2, the image processing device 1 includes a control unit 2 and a storage 3. The control unit 2 includes a line segment extraction unit 21, an improper area determination unit 22, a delimiting line detection unit 23, an exclusion determination unit 24, a parking space detection unit 25, a parking space managing unit 26, and a stop position determination unit 27. The storage 3 has delimiting line information 31.

The control unit 2 includes a computer having, for example, a CPU (Central Processing Unit), a ROM (Read Only Memory), a RAM (Random Access Memory), an HDD (Hard Disk Drive), an I/O port, and the like, and a variety of circuits.

The CPU of the computer is configured to read and execute programs stored in the ROM, thereby functioning as the line segment extraction unit 21, the improper area determination unit 22, the delimiting line detection unit 23, the exclusion determination unit 24, the parking space detection unit 25, the parking space managing unit 26 and the stop position determination unit 27 of the control unit 2.

Also, at least some or all of the line segment extraction unit 21, the improper area determination unit 22, the delimiting line detection unit 23, the exclusion determination unit 24, the parking space detection unit 25, the parking space managing unit 26 and the stop position determination unit 27 of the control unit 2 may be configured by hardware such as an ASIC (Application Specific Integrated Circuit), an FPGA (Field Programmable Gate Array) and the like.

When it is assumed that the vehicle C travels in the parking lot (for example, the vehicle speed is lower than 30 km/h), for example, the control unit 2 may execute detection processing of the parking space PS, which will be described later, or may execute the detection processing all during the traveling of the vehicle C.

The line segment extraction unit 21 is configured to detect edge lines connecting edge points based on luminance of each pixel, from the image data input from the vehicle-mounted camera 10. Specifically, the line segment extraction unit 21 converts the image data input from the vehicle-mounted camera 10 into a gray scale image by performing gray scaling for the image data. The gray scaling is processing of converting each pixel of image data so as to express the same with each gradation (for example, 256 gradations) from white to black, in correspondence to luminance.

The line segment extraction unit 21 may obtain an edge strength of each pixel and a luminance gradient by applying a Sobel filter to the gray scale image, for example. Then, the line segment extraction unit 21 may extract the edge points by extracting pixels having edge strength exceeding a predetermined value, and may extract the edge lines by connecting the adjacent edge points. The line segment extraction unit 21 is configured to notify edge information about the extracted edge points and edge lines to the improper area determination unit 22.

The improper area determination unit 22 is configured to determine whether there is an improper area in which it is difficult to detect the delimiting line L for establishing the parking space PS, based on the edge points and edge lines extracted by the line segment extraction unit 21. For example, the improper area determination unit 22 may determine, as the improper area, a non-paved road surface area (for example, gravels) and a grating area, in which more edge points are extracted, as compared to a paved road surface.

Specifically, the improper area determination unit 22 may determine, as the improper area, an area in which a density of the respective edge points is equal to or greater than a predetermined value and the luminance gradient of the respective edge points is not uniform. The improper area determination unit 22 is configured to remove edge information about the improper area from the edge information, based on the determined improper area, and to provide the resultant information to later processing.

The delimiting line detection unit 23 is configured to detect the delimiting line candidate Lc, which is a candidate of the delimiting line L for delimiting the parking space PS, based on the edge lines extracted by the line segment extraction unit 21. Specifically, the delimiting line detection unit 23 detects, as the delimiting line candidate Lc, a rectangular area of which edge lines parallel with each other and having an interval belonging to a predetermined range corresponding to a width of the delimiting line L are set as two sides.

In other words, the delimiting line detection unit 23 detects, as the delimiting line candidate Lc, a rectangular area of which a pair of edge lines corresponding to a boundary between an actual delimiting line and a road surface is set as two sides.

Figure 3:
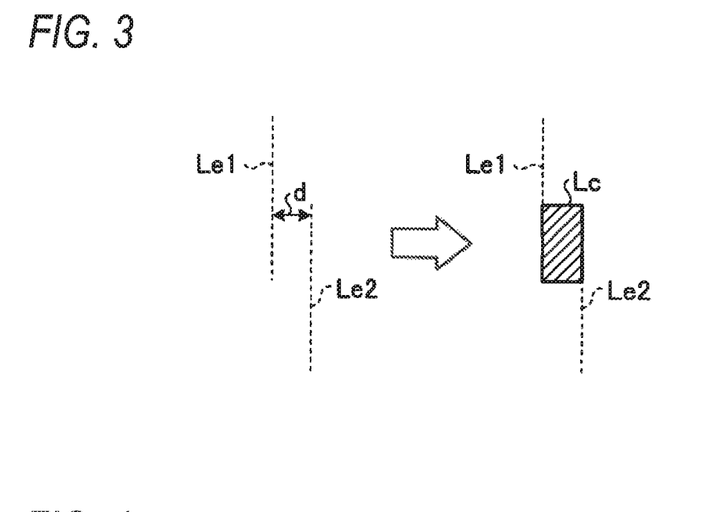
FIG. 3 depicts an example of delimiting line detection processing according to the exemplary embodiment.

That is, the delimiting line detection unit 23 detects, as the delimiting line candidate Lc, a pair of edge lines corresponding to left and right ends of each delimiting line L in a width direction. FIG. 3 depicts an example of delimiting line detection processing according to the exemplary embodiment. As shown in FIG. 3, when an edge line Le1 and ab edge line Le2 are substantially parallel with each other and a distance d between the edge line Le1 and the edge line Le2 belongs to a predetermined range, the delimiting line detection unit 23 detects the delimiting line candidate Lc from the edge line Le1 and the edge line Le2.

For example, a case in which the delimiting line is a white line is described. In this case, since the luminance difference increases at a boundary between the white line and the road surface, the two edge lines substantially parallel with each other can be easily extracted. For this reason, the delimiting line detection unit 23 detects, as the delimiting line candidate Lc, the pair of the edge line Le1 and the edge line Le2 substantially parallel with each other and arranged with a predetermined interval.

Here, the predetermined range is a range corresponding to a line width of the delimiting line, and is, for example, a range of 5 cm to 10 cm. Also, as shown in FIG. 3, the delimiting line detection unit 23 detects, as the delimiting line candidate Lc, an area in which the edge line Le1 and the edge line Le2 are overlapped, and the distance d is a width of the delimiting line candidate Lc.

In other words, the delimiting line detection unit 23 does not detect, as the delimiting line candidate Lc, an area in which the edge line Le1 and the edge line Le2 are not overlapped. As described above, the reason is that a delimiting line is configured by a pair of edge lines corresponding to left and right ends of the delimiting line in the width direction.

That is, a noise is also assumed for the area in which the edge line Le1 and the edge line Le2 are not overlapped. For this reason, the delimiting line detection unit 23 does not detect, as the delimiting line candidate Lc, an area in which the edge line Le1 and the edge line Le2 are not overlapped, thereby detecting only the delimiting line candidate Lc with high accuracy. Thereby, it may be possible to suppress false detection of the parking space PS.

Returning to FIG. 2, the delimiting line detection unit 23 is configured to register the information about the delimiting line candidates Lc detected as described above in the delimiting line information 31 of the storage 3. For example, when the delimiting line candidate Lc is detected, the delimiting line detection unit 23 registers vertex coordinates of four corners of the detected delimiting line candidate Lc in the delimiting line information 31.

In the meantime, the delimiting line detection unit 23 may execute the detection processing of the delimiting line candidate Lc, except the improper area detected by the improper area determination unit 22. In other words, the delimiting line detection unit 23 does not execute the detection processing of the delimiting line candidate Lc for the improper area. Thereby, it may be possible to suppress a processing load of the control unit 2.

The exclusion determination unit 24 is configured to determine whether there is a parking-unavailable area in which the parking of the vehicle C is not permitted, based on the delimiting line candidates Lc detected by the delimiting line detection unit 23 and registered in the delimiting line information 31. For example, the exclusion determination unit 24 determines whether there is a parking-unavailable area such as a stripe area, as the parking-unavailable area.

Specifically, when the delimiting line candidates Lc substantially parallel with each other are assumed as support delimiting lines and a plurality of parallel lines inclined to the support delimiting lines exists with a predetermined interval, the exclusion determination unit 24 regards an area between the support delimiting lines, as a stripe area. The exclusion determination unit 24 determines the stripe area, as the parking-unavailable area.

Also, the exclusion determination unit 24 may detect each road surface marker included in the image data by matching the delimiting line candidate Lc detected by the delimiting line detection unit 23 and a template model of each road surface marker.

Also, the exclusion determination unit 24 may determine whether there is the delimiting line candidate Lc, which is not necessary to detect the parking space PS such as a road surface marker. For example, when the pair of white delimiting line candidates Lc1 is arranged with the black delimiting line candidate Lc2 being interposed therebetween, the exclusion determination unit 24 evaluates the distance D between the pair of white delimiting line candidates Lc1.

When the distance D between the pair of white delimiting line candidates Lc1 is equal to or smaller than the predetermined threshold value, the exclusion determination unit 24 excludes the black delimiting line candidate Lc2 located between the pair of white delimiting line candidates Lc1 from the candidates of the delimiting line L.

When the unnecessary delimiting line candidate Lc is determined, the exclusion determination unit 24 excludes the corresponding delimiting line candidate Lc from the delimiting line information 31. Also, the exclusion determination unit 24 applies the information about the parking-unavailable area to the delimiting line information 31, and notifies the same to the parking space detection unit 25.

The parking space detection unit 25 is configured to detect the parking spaces PS, based on the delimiting line candidates Lc detected by the delimiting line detection unit 23. Specifically, the parking space detection unit 25 detects, as the parking space PS, an area between the pair of delimiting line candidates Lc arranged in parallel with each other with a predetermined interval.

Here, the predetermined interval is a width of a standard parking area for general public defined by laws and the like relating to the parking lot. Also, in this case, the parking space detection unit 25 may detect the parking space PS while avoiding the area determined as the parking-unavailable area by the exclusion determination unit 24.

That is, the parking space detection unit 25 may detect the parking space PS while avoiding the stripe area and the like determined as the parking-unavailable area. When the parking space detection unit 25 detects the parking space PS, it notifies parking space information about the parking space PS to the parking space managing unit 26.

In the below, the delimiting line candidate Lc used for detection as the parking space PS by the parking space detection unit 25 is referred to as 'delimiting line L'. Also, the parking space information includes the vertex coordinates of each parking space PS based on the vehicle C (i.e., the vertex coordinates of a side of the delimiting line L in contact with the parking space PS).

The parking space managing unit 26 is configured to manage the parking spaces PS detected by the parking space detection unit 25 in chronical order. The parking space managing unit 26 may estimate a moving amount of the vehicle C on the basis of the sensor values input from the sensor group Sc, and estimate the vertex coordinates of each actual parking space PS based on past parking space information, based on the moving amount.

Also, the parking space managing unit 26 may update coordinate information of the parking space PS in the past parking space information, based on the newly input parking space information. That is, the parking space managing unit 26 is configured to frequently update a relative positional relationship of the vehicle C and the parking space PS, in association with movement of the vehicle C.

Also, the parking space managing unit 26 may set a detection range of the parking space PS while assuming that a plurality of parking spaces PS is continuously arranged. For example, the parking space managing unit 26 sets one parking space PS detected by the parking space detection unit 25, as a reference, and assumes that there is a plurality of parking spaces PS continuously to the parking space PS.

The parking space managing unit 26 is configured to set positions of the assumed parking spaces PS, as a detection range. Thereby, since the line segment extraction unit 21 has only to execute the detection processing of the edge line only within the detection range set by the parking space managing unit 26, it may be possible to suppress the processing load of the control unit 2.

The stop position determination unit 27 is configured to determine a stop position upon parking of the vehicle C in the parking space PS, based on the edge lines detected by the line segment extraction unit 21. For example, the stop position determination unit 27 determines a stop position of the vehicle C by detecting a wheel block, a curbstone, a wall, a white line extending in a vehicle width direction and the like, based on the edge lines detected by the line segment extraction unit 21.

When a wheel block is detected, the stop position determination unit 27 determines a stop position so that rear wheels of the vehicle C are to be located just before the wheel block. When a white line, a wall and the like are detected, instead of the wheel block, the stop position determination unit 27 determines a stop position so that a rear end (for example, a tip end of a rear bumper) of the vehicle C is to be located just before the white line.

The storage 3 corresponds to a RAM and an HDD, for example. The RAM and the HDD can store therein a variety of information and information of diverse programs. In the meantime, the image processing device 1 may be configured to acquire the programs and diverse information through another computer connected with a wired or wireless network, or a portable recording medium.

In the delimiting line information 31, the information about the delimiting line candidates Lc detected by the delimiting line detection unit 23 is registered. For example, in the delimiting line information 31, the vertex coordinates of four corners of the detected delimiting line candidate Lc are registered.

MODIFIED EXAMPLES

Figure 4:
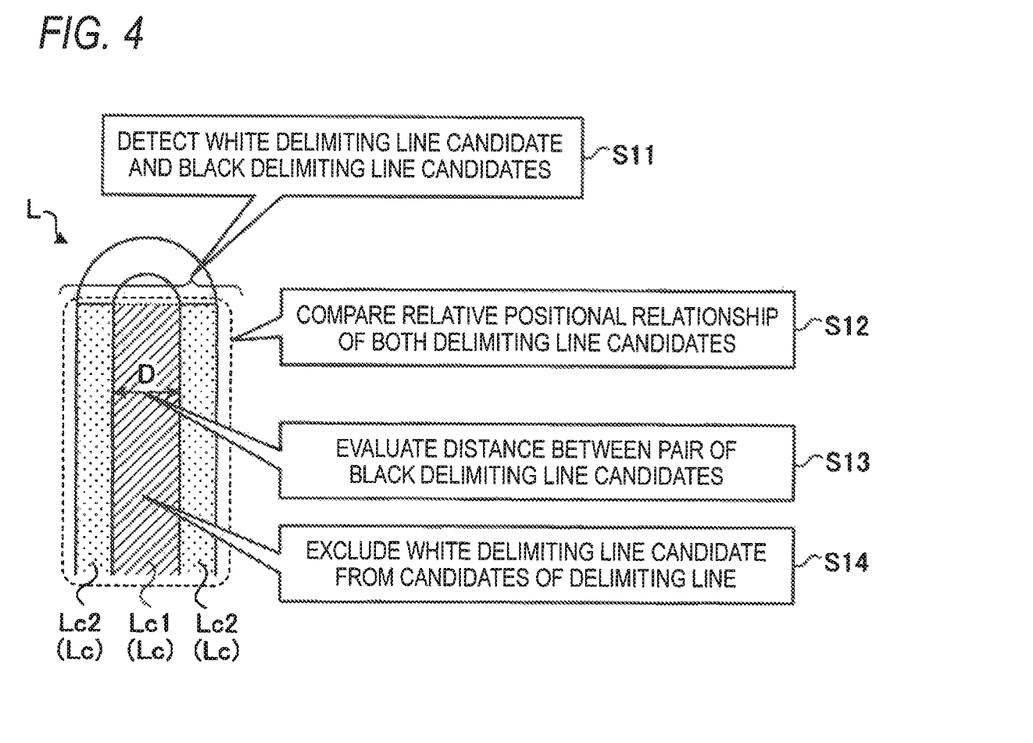
FIG. 4 illustrates details of the image processing method according to a first modified example of the exemplary embodiment.

In the below, diverse modified examples of the image processing according to the exemplary embodiment are described with reference to FIGS. 4 to 6. FIG. 4 illustrates details of the image processing method in accordance with a first modified example of the exemplary embodiment.

As shown in FIG. 4, in a case in which the U-shaped delimiting line L is drawn with white lines, when the road surface is wetted due to rain and the like, in the dark environment such as night-time, the linear white line parts are detected as the black delimiting line candidates Lc2 having low luminance, and an area between the white line parts is detected as the white delimiting line candidate Lc1 having high luminance.

In this case, the exclusion determination unit 24 detects first the white delimiting line candidate Lc1 and the black delimiting line candidates Lc2 from the captured data (step S11). In step S11, the pair of black delimiting line candidates Lc2 and one white delimiting line candidate Lc1 are detected.

Then, the exclusion determination unit 24 compares a relative positional relationship of both the detected delimiting line candidates Lc (the white delimiting line candidates Lc1 and the black delimiting line candidates Lc2) (step S12). When the pair of black delimiting line candidates Lc2 is arranged with the white delimiting line candidate Lc1 being interposed therebetween, the exclusion determination unit 24 evaluates a distance D between the pair of black delimiting line candidates Lc2 (step S13).

When the distance D between the pair of black delimiting line candidates Lc2 is equal to or smaller than the predetermined threshold value, the exclusion determination unit 24 excludes the white delimiting line candidate Lc1 located between the pair of black delimiting line candidates Lc2 from the candidates of the delimiting line L (step S14).

Thereby, the exclusion determination unit 24 can exclude the falsely detected white delimiting line candidate Lc1 from the candidates of the delimiting line L. Therefore, according to the first modified example, even when the road surface is wetted due to rain and the like, in the dark environment such as night-time, it may be possible to improve the detection accuracy of the delimiting line L.

As described above, according to the exemplary embodiment and the first modified example, even in the light environment such as daytime and even when the road surface is wetted due to rain and the like, in the dark environment such as night-time, it may be possible to improve the detection accuracy of the delimiting line L.

In the exemplary embodiment and the first modified example, the delimiting line L is shown with the U-shaped line. However, the shape of the delimiting line L to which the present disclosure is applied is not limited to the U-shaped line. FIG. 5 illustrates details of the image processing method in accordance with a second modified example of the exemplary embodiment.

Figure 5:
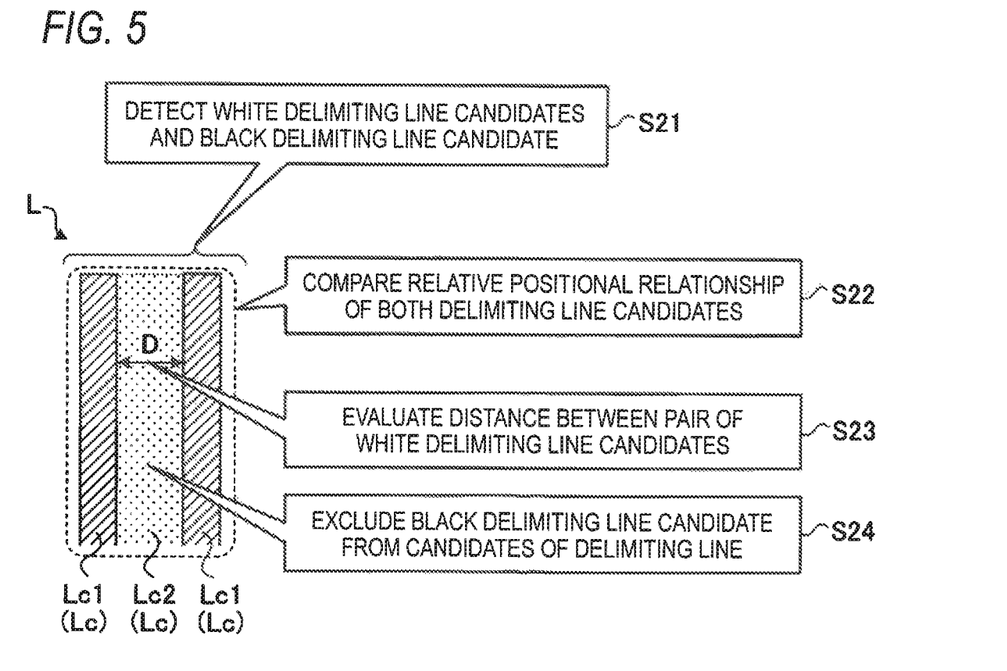
FIG. 5 illustrates details of the image processing method according to a second modified example of the exemplary embodiment.

As shown in FIG. 5, when the delimiting line L, which are two adjacent parallel lines, is drawn with white lines, the white line parts are detected as the white delimiting line candidates Lc1 and an area between the white line parts is detected as the black delimiting line candidate Lc2, in the light environment such as daytime.

In this case, the exclusion determination unit 24 detects first the white delimiting line candidates Lc1 and the black delimiting line candidate Lc2 from the captured data (step S21). In step S21, the pair of white delimiting line candidates Lc1 and one black delimiting line candidate Lc2 are detected.

Then, the exclusion determination unit 24 compares a relative positional relationship of both the detected delimiting line candidates Lc (the white delimiting line candidates Lc1 and the black delimiting line candidate Lc2) (step S22). When the pair of white delimiting line candidates Lc1 is arranged with the black delimiting line candidate Lc2 being interposed therebetween, the exclusion determination unit 24 evaluates a distance D between the pair of white delimiting line candidates Lc1 (step S23).

When the distance D between the pair of white delimiting line candidates Lc1 is equal to or smaller than the predetermined threshold value, the exclusion determination unit 24 excludes the black delimiting line candidate Lc2 located between the pair of white delimiting line candidates Lc1 from the candidates of the delimiting line L (step S24).

Thereby, the exclusion determination unit 24 can exclude the falsely detected black delimiting line candidate Lc2 from the candidates of the delimiting line L. Therefore, according to the second modified example, even when the delimiting line L is drawn with the two adjacent parallel lines, it may be possible to improve the detection accuracy of the delimiting line L.

Figure 6:
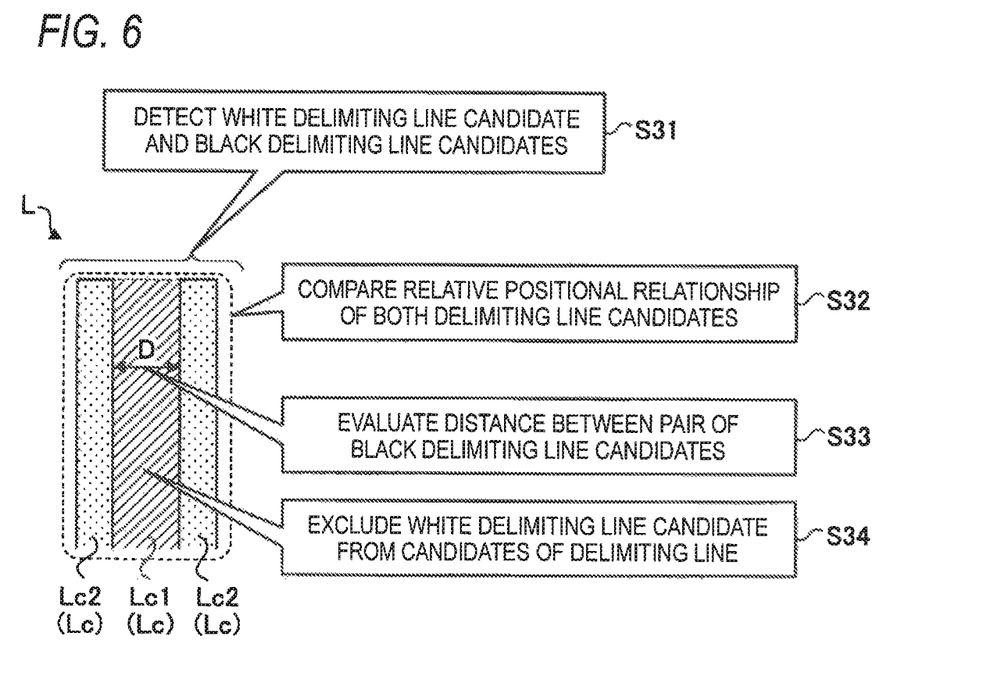
FIG. 6 illustrates details of the image processing method according to a third modified example of the exemplary embodiment.

FIG. 6 illustrates details of the image processing method in accordance with a third modified example of the exemplary embodiment. As shown in FIG. 6, in a case in which the delimiting line L is drawn with two adjacent parallel lines, when the road surface is wetted due to rain and the like, in the dark environment such as night-time, the road surface may have luminance higher than the white lines. In this case, the white line parts are detected as the black delimiting line candidates Lc2 having low luminance, and an area between the white line parts is detected as the white delimiting line candidate Lc1 having high luminance.

In this case, the exclusion determination unit 24 detects first the white delimiting line candidate Lc1 and the black delimiting line candidates Lc2 from the captured data (step S31). In step S31, the pair of black delimiting line candidates Lc2 and one white delimiting line candidate Lc1 are detected.

Then, the exclusion determination unit 24 compares a relative positional relationship of both the detected delimiting line candidates Lc (the white delimiting line candidate Lc1 and the black delimiting line candidates Lc2) (step S32). When the pair of black delimiting line candidates Lc2 is arranged with the white delimiting line candidate Lc1 being interposed therebetween, the exclusion determination unit 24 evaluates a distance D between the pair of black delimiting line candidates Lc2 (step S33).

When the distance D between the pair of black delimiting line candidates Lc2 is equal to or smaller than the predetermined threshold value, the exclusion determination unit 24 excludes the white delimiting line candidate Lc1 located between the pair of black delimiting line candidates Lc2 from the candidates of the delimiting line L (step S34).

Thereby, the exclusion determination unit 24 can exclude the falsely detected white delimiting line candidate Lc1 from the candidates of the delimiting line L. Therefore, according to the third modified example, even when the delimiting line L is drawn with the two adjacent parallel lines and the road surface is wetted due to rain and the like, in the dark environment such as night-time, it may be possible to improve the detection accuracy of the delimiting line L.

<Sequence of Image Processing>

Figure 7:
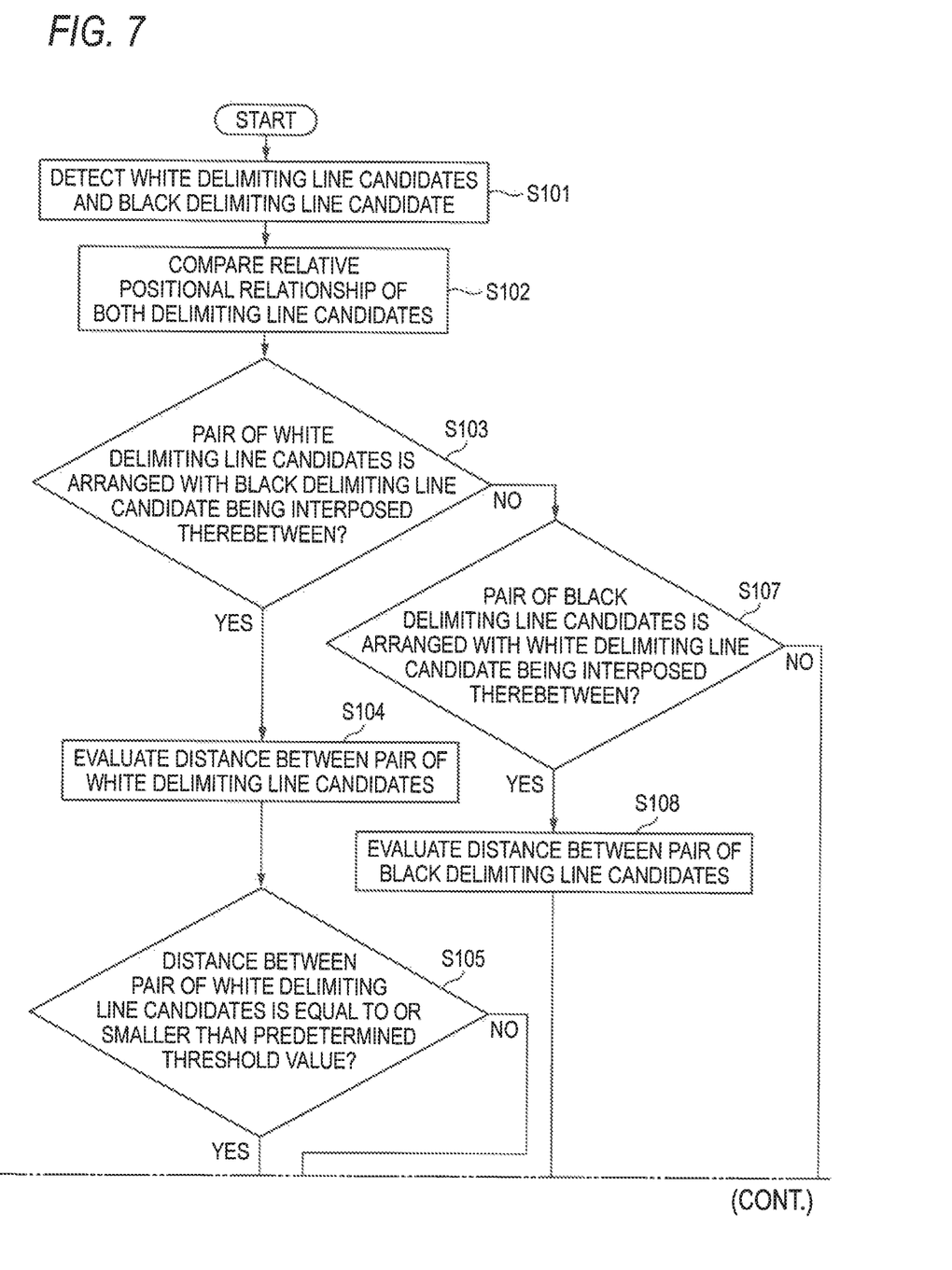
FIG. 7 is a flowchart depicting a sequence of the image processing method according to the exemplary embodiment.

Subsequently, a sequence of the image processing according to the exemplary embodiment is described with reference to FIG. 7. FIG. 7 is a flowchart depicting a sequence of the image processing according to the exemplary embodiment.

First, the delimiting line detection unit 23 detects the white delimiting line candidates Lc1 and the black delimiting line candidate Lc2 from the captured data (step S101). Then, the exclusion determination unit 24 compares a relative positional relationship of both the detected delimiting line candidates Lc (the white delimiting line candidates Lc1 and the black delimiting line candidate Lc2) (step S102).

Then, the exclusion determination unit 24 determines whether a pair of the white delimiting line candidates Lc1 is arranged with the black delimiting line candidate Lc2 being interposed therebetween (step S103). When it is determined that the pair of white delimiting line candidates Lc1 is arranged with the black delimiting line candidate Lc2 being interposed therebetween (step S103, Yes), the exclusion determination unit 24 evaluates the distance D between the pair of white delimiting line candidates Lc1 (step S104).

Then, the exclusion determination unit 24 determines whether the distance D between the pair of white delimiting line candidates Lc1 is equal to or smaller than the predetermined threshold value (step S105). Here, when it is determined that the distance D between the pair of white delimiting line candidates Lc1 is equal to or smaller than the predetermined threshold value (step S105, Yes), the exclusion determination unit 24 excludes the black delimiting line candidate Lc2 interposed between the pair of white delimiting line candidates Lc1 from the candidates of the delimiting line L (step S106), and ends the processing.

On the other hand, when it is determined that the distance D between the pair of white delimiting line candidates Lc1 is not equal to or smaller than the predetermined threshold value (step S105, No), the processing is over.

On the other hand, when it is determined in step S103 that the pair of white delimiting line candidates Lc1 is not arranged with the black delimiting line candidate Lc2 being interposed therebetween (step S103, No), the exclusion determination unit 24 determines whether a pair of black delimiting line candidates Lc2 is arranged with the white delimiting line candidate Lc1 being interposed (step S107).

When it is determined that the pair of black delimiting line candidates Lc2 is arranged with the white delimiting line candidate Lc1 being interposed (step S107, Yes), the exclusion determination unit 24 evaluates the distance D between the pair of black delimiting line candidates Lc2 (step S108).

Then, the exclusion determination unit 24 determines whether the distance D between the pair of black delimiting line candidates Lc2 is equal to or smaller than the predetermined threshold value (step S109). Here, when it is determined that the distance D between the pair of black delimiting line candidates Lc2 is equal to or smaller than the predetermined threshold value (step S109, Yes), the exclusion determination unit 24 excludes the white delimiting line candidate Lc1 interposed between the pair of black delimiting line candidates Lc2 from the candidates of the delimiting line L (step S110), and ends the processing.

On the other hand, when it is determined that the distance D between the pair of black delimiting line candidates Lc2 is not equal to or smaller than the predetermined threshold value (step S109, No), the processing is over. Also, when it is determined in step S107 that the pair of black delimiting line candidates Lc2 is not arranged with the white delimiting line candidate Lc1 being interposed therebetween (step S107, No), the processing is over.

Although the exemplary embodiment of the present disclosure has been described, the present disclosure is not limited to the exemplary embodiment, and a variety of changes can be made without departing from the gist of the present disclosure. For example, in the exemplary embodiment, the delimiting line L is a U-shaped line or the two adjacent parallel lines. However, the shape of the delimiting line L is not limited thereto.

The image processing device 1 according to the exemplary embodiment includes the delimiting line detection unit 23 and the exclusion determination unit 24. The delimiting line detection unit 23 is configured to detect the delimiting line candidate Lc, which is a candidate of the delimiting line L for delimiting the parking space PS, based on the image data obtained by capturing the surrounding of the vehicle C. The exclusion determination unit 24 is configured to determine whether or not to exclude the delimiting line candidate Lc detected by the delimiting line detection unit 23 from the candidates of the delimiting line L. Also, in a case in which the white delimiting line candidate Lc1, which is detected from the delimiting line L having luminance higher than the road surface, and the black delimiting line candidate Lc2, which is detected from the delimiting line L having luminance lower than the road surface, are detected and one of the white delimiting line candidate Lc1 and the black delimiting line candidate Lc2 is set as a first delimiting line candidate and the other is set as a second delimiting line candidate, when a pair of the first delimiting line candidates is arranged with the second delimiting line candidate being interposed therebetween and a distance D between the pair of first delimiting line candidates is equal to or smaller than the predetermined threshold value, the exclusion determination unit 24 excludes the second delimiting line candidate from the candidates of the delimiting line L. Thereby, even in the light environment such as daytime and even when the road surface is wetted due to rain and the like in the dark environment such as night-time, it may be possible to improve the detection accuracy of the delimiting line L.

Also, in the image processing device 1 according to the exemplary embodiment, when a pair of the white delimiting line candidates Lc1 is arranged with the black delimiting line candidate Lc2 being interposed therebetween and a distance D between the pair of white delimiting line candidates Lc1 is equal to or smaller than the predetermined threshold value, the exclusion determination unit 24 excludes the black delimiting line candidate Lc2 from the candidates of the delimiting line L. Thereby, in the light environment such as daytime, it may be possible to improve the detection accuracy of the delimiting line L.

Also, in the image processing device 1 according to the exemplary embodiment, when a pair of the black delimiting line candidates Lc2 is arranged with the white delimiting line candidate Lc1 being interposed therebetween and a distance D between the pair of black delimiting line candidates Lc2 is equal to or smaller than the predetermined threshold value, the exclusion determination unit 24 excludes the white delimiting line candidate Lc1 from the candidates of the delimiting line L. Thereby, even when the road surface is wetted due to rain and the like in the dark environment such as night-time, it may be possible to improve the detection accuracy of the delimiting line L.

Also, the image processing method according to the exemplary embodiment includes the delimiting line detection process (step S101) and the exclusion determination process (steps S102 to S110). In the delimiting line detection process (step S101), the delimiting line candidate Lc, which is to be the candidate of the delimiting line L for delimiting the parking space PS, is detected based on the image data obtained by capturing the surrounding of the vehicle C. In the exclusion determination process (steps S102 to S110), it is determined whether or not to exclude the delimiting line candidate Lc detected by the delimiting line detection process (step S101) from the candidates of the delimiting line L. Also, in the exclusion determination process (step S102 to S110), in a case in which the white delimiting line candidate Lc1, which is detected from the delimiting line L having luminance higher than the road surface, and the black delimiting line candidate Lc2, which is detected from the delimiting line L having luminance lower than the road surface, are detected and one of the white delimiting line candidate Lc1 and the black delimiting line candidate Lc2 is set as a first delimiting line candidate and the other is set as a second delimiting line candidate, when a pair of the first delimiting line candidates is arranged with the second delimiting line candidate being interposed therebetween and a distance D between the pair of first delimiting line candidates is equal to or smaller than the predetermined threshold value, the second delimiting line candidate is excluded from the candidates of the delimiting line L (steps S106 and S110). Thereby, even in the light environment such as daytime and even when the road surface is wetted due to rain and the like in the dark environment such as night-time, it may be possible to improve the detection accuracy of the delimiting line L.

The additional effects and modified examples can be easily deduced by one skilled in the art. For this reason, the wider aspect of the present disclosure is not limited to the specific details and exemplary embodiments as described above. Therefore, a variety of changes can be made without departing from the spirit and scope of the concept of the general invention defined by the claims and equivalents thereof.

What is claimed is:

1. An image processing device comprising:
a delimiting line detection unit configured to detect a delimiting line candidate based on image data obtained by capturing a surrounding of a vehicle, the delimiting line candidate being a candidate of a delimiting line for delimiting a parking space; and
an exclusion determination unit configured to determine whether or not to exclude the delimiting line candidate detected by the delimiting line detection unit from the candidate of the delimiting line,
wherein, in a case where
at least one white delimiting line candidate which is detected from a delimiting line having luminance higher than luminance of a road surface, and at least one black delimiting line candidate which is detected from a delimiting line having luminance lower than the luminance of the road surface are detected, and
one of the at least one white delimiting line candidate and the at least one black delimiting line candidate is set as at least one first delimiting line candidate, and other of the at least one white delimiting line candidate and the at least one black delimiting line candidate is set as at least one second delimiting line candidate while the at least one first delimiting line candidate includes a pair of first delimiting line candidates between which the at least one second delimiting line candidate is arranged and a distance between the first delimiting line candidates of the pair of first delimiting candidates is equal to or smaller than a predetermined threshold value,
the exclusion determination unit excludes the at least one second delimiting line candidate from the candidate of the delimiting line.

2. The image processing device according to claim 1, wherein,
in a case where a pair of white delimiting line candidates between which the black delimiting line candidate is arranged and a distance between the white delimiting line candidates of the pair of white delimiting candidates is equal to or smaller than the predetermined threshold value, the exclusion determination unit excludes the black delimiting line candidate from the candidate of the delimiting line.

3. The image processing device according to claim 1, wherein,
in a case where a pair of black delimiting line candidates between which the white delimiting line candidate is arranged and a distance between the black delimiting line candidates of the pair of black delimiting candidates is equal to or smaller than the predetermined threshold value, the exclusion determination unit excludes the white delimiting line candidate from the candidate of the delimiting line.

4. An image processing method comprising:
detecting a delimiting line candidate a delimiting line candidate based on image data obtained by capturing a surrounding of a vehicle, the delimiting line candidate being a candidate of a delimiting line for delimiting a parking space; and
determining whether or not to exclude the delimiting line candidate detected, from the candidate of the delimiting line,
wherein, in a case where
at least one white delimiting line candidate which is detected from a delimiting line having luminance higher than luminance of a road surface, and at least one black delimiting line candidate which is detected from a delimiting line having luminance lower than the luminance of the road surface are detected, and
one of the at least one white delimiting line candidate and the at least one black delimiting line candidate is set as at least one first delimiting line candidate, and other of the at least one white delimiting line candidate and the at least one black delimiting line candidate is set as at least one second delimiting line candidate while the at least one first delimiting line candidate includes a pair of first delimiting line candidates between which the at least one second delimiting line candidate is arranged and a distance between the first delimiting line candidates of the pair of first delimiting candidates is equal to or smaller than a predetermined threshold value,
the determining includes excluding the at least one second delimiting line candidate from the candidate of the delimiting line.

\* \* \* \* \*